UNITED STATES PATENT OFFICE.

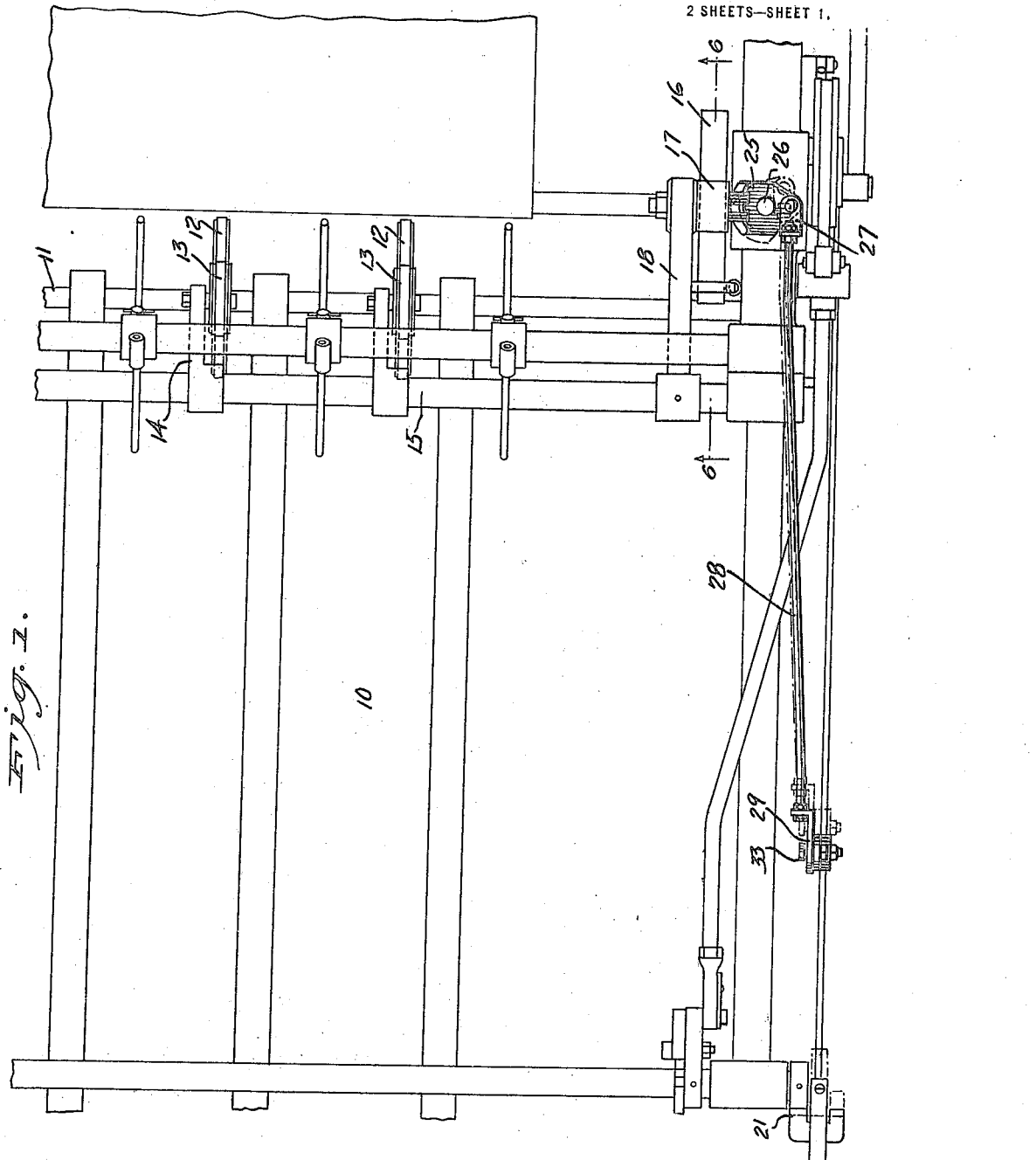

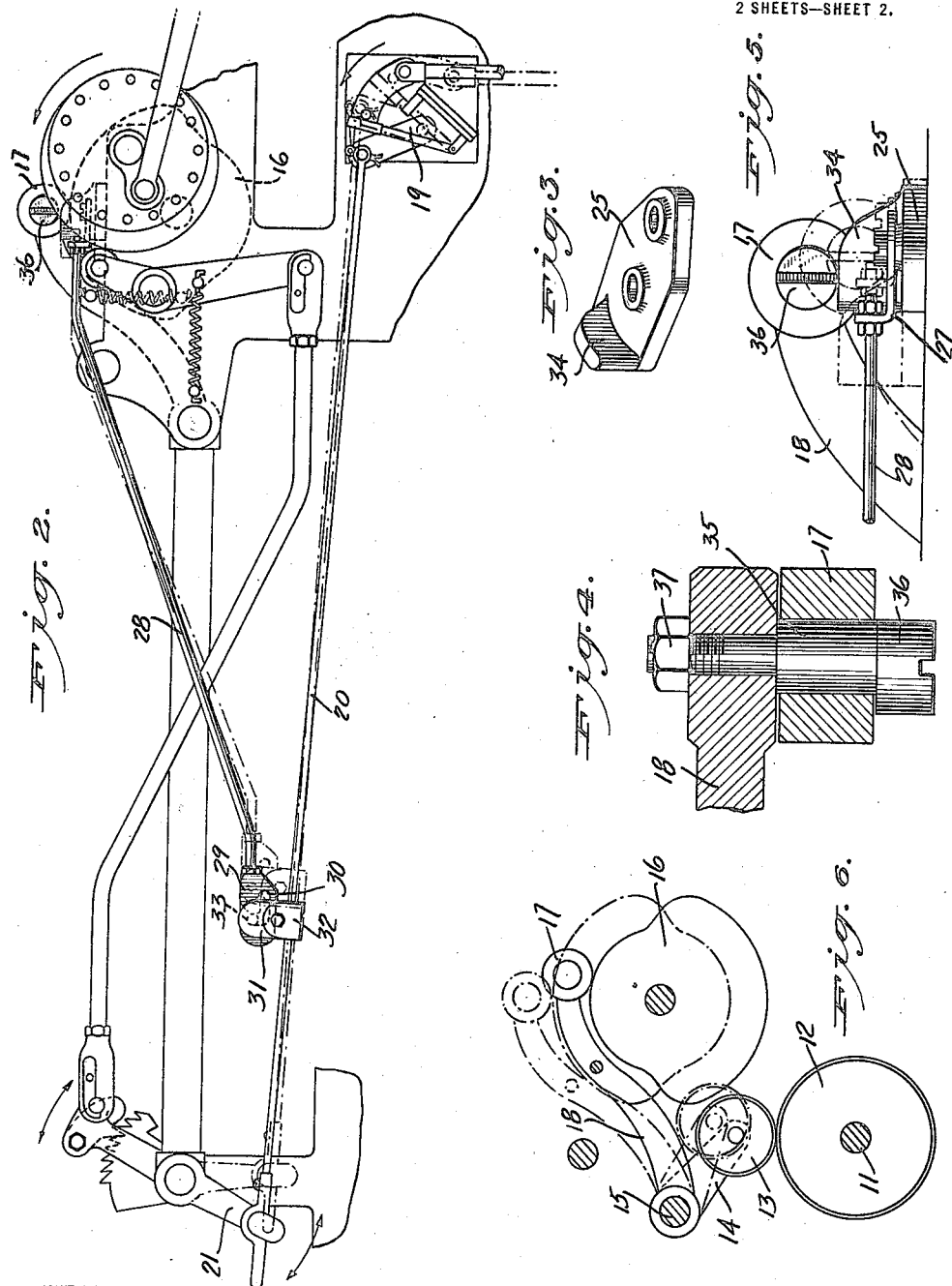

PAUL GITZENDANNER, OF WOODHAVEN, NEW YORK, AND FRANK J. ALBERT, OF WEST NEW YORK, NEW JERSEY.

DELIVERY-WHEEL TRIP FOR FEEDERS.

1,426,980.   Specification of Letters Patent.   Patented Aug. 22, 1922.

Application filed October 7, 1921. Serial No. 506,180.

*To all whom it may concern:*

Be it known that we, PAUL GITZENDANNER, a citizen of the United States, and a resident of Woodhaven, borough of Queens, in the county of Queens and State of New York, and FRANK J. ALBERT, a citizen of the United States, and a resident of West New York, in the county of Hudson and State of New Jersey, have invented a new and Improved Delivery-Wheel Trip for Feeders, of which the following is a full, clear, and exact description.

This invention has relation to sheet feeders for printing presses, folding machines, or the like, and refers more specifically to a trip for the idler delivery wheels thereof. The sheet feeders now in general use are usually equipped with an automatic throw-off mechanism which functions to cut off the power when a defective feeding of a sheet occurs, but due to the momentum of the feeder mechanism, it almost invariably happens that several succeeding sheets are fed by the feeder mechanism, resulting in the distribution of said sheets before the feeder mechanism finally comes to rest.

As an object therefore the invention contemplates a trip for the idler delivery wheels of the feeder, which trip is actuated by the throw-off mechanism to positively prevent further feeding of the sheets by the momentum of the feeder mechanism whereby to effect a saving of the sheets as well as to prevent undue clogging of the feeder and the time and trouble incident to the removal of the sheets which become clogged.

As a further object the invention contemplates a trip including means for coupling the same with the automatic throw-off mechanism, which means may be shifted to permit of the return of the throw-off mechanism to normal position for operating the feeder without returning the trip to normal position, whereby to allow the idler delivery wheels to function for the purpose of feeding test sheets by hand through the feeder.

As a still further object the invention aims to produce a device of the character and for the purpose specified, which is extremely simple in its construction and operation, and which is applicable to practically all standard types of papers which are now in use which are equipped with automatic throw-off mechanisms.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed and by variations in the phraseology of the same.

In the drawings—

Figure 1 is a fragmentary plan view of a feeder equipped with the idler delivery wheel trip and illustrating respectively in full and dotted lines the active and inactive positions of said trip.

Fig. 2 is a fragmentary side elevation thereof.

Fig. 3 is a detail perspective view of the trip.

Fig. 4 is a sectional view illustrating the improved form of pivot bolt used in connection with the trip.

Fig. 5 is an enlarged detail side elevation illustrating respectively in full and dotted lines the trip in its active and inactive positions.

Fig. 6 is a diagrammatic view illustrating the delivery wheel, idler delivery wheel, and means for actuating the latter.

Referring to the drawings by characters of reference, 10 designates generally a sheet feeder of any approved standard type including a drive shaft 11 upon which delivery wheels 12 are mounted for positive rotation and over which the sheets are moved by the contact of the idler delivery wheels 13 therewith. The idler delivery wheels 13 are mounted on the arms 14 secured to a rock shaft 15 which is intermittently actuated to raise and lower the idler delivery wheels 13 into contact with the delivery wheels 12 by means of a cam 16 which coacts with a roller 17 mounted on the free extremity of an arm 18 secured to said rock shaft. The feeder is provided with a switch 19 which is actuated by a rod 20 connected with a throw-off mechanism 21 which automatically operates upon defective feeding of the sheet to cut off the switch.

The trip mechanism which constitutes the invention and is designed as an attachment for the feeder, comprises a trip arm 25 mounted for horizontal swinging movement on a pivot 26 adjacent the cam 16 and roller 17. One extremity of the trip arm has connected thereto by a yoke 27 a pull rod 28, the opposite extremity of which has secured thereto a coupling head 29. The coupling head is provided with a bayonet or angular slot 30. A coupler member 31 is secured by a clip 32 to the rod 20 of the cut off mechanism and the coupler member 31 is provided with a headed pin 33 received by the bayonet slot 30. The free extremity of the trip arm 25 is provided with an upstanding supporting rib 34. In lieu of the usual pivot bolt for mounting the roller 17 on the free extremity of the arm 18, a pivot bolt 35 is employed provided with an enlarged integral head 36 at one end, which head is mounted eccentrically on the shank of the pivot bolt for a purpose to be hereafter described.

In use and operation when the throw-off mechanism 21 exerts a pull on the rod 20 to release the switch 19 and cut off the power for driving the feeder, a pull is simultaneously exerted on the pull rod 28 thereby turning the trip arm 25 to dispose the supporting rib 34 beneath the head 36 of the pivot bolt as the arm 18 and idler delivery wheels 13 are raised by the cam, thereby preventing the idler delivery wheels 13 from lowering into contact with the delivery wheels 12 to prevent further feeding of sheets irrespective of continued operation of the feeder by momentum. By providing the coupling head 29 with a bayonet slot 30 the operator may manually engage the switch elements without throwing the trip lever to inactive position whereby the idler delivery wheels 13 will remain in raised position while the operator feeds one or more test sheets through the feeder. By providing the pivot bolt 35 with an eccentrically mounted head 36 it is obvious that the height at which the arm 18 will be lifted may be regulated by loosening the lock nut 37 and rotating the pivot bolt.

We claim:

1. The combination with a sheet feeder for printing presses, folding machines or the like which includes an automatic throw-off mechanism, idler and driven delivery wheels between which the sheets are fed when the wheels are brought into contact with each other, and a mechanism for intermittently disposing said wheels in and out of contact, of means operable by the automatic throw-off mechanism of the feeder and operatively associated with the intermittent mechanism for maintaining the delivery wheels out of contact whereby upon operation of the automatic throw-off mechanism, said means will serve to prevent further feeding of the sheets through the momentum of the machine, and a connection between said means and the automatic throw-off mechanism to permit of the re-setting of the automatic throw-off mechanism without rendering the same means inactive.

2. In an attachment for sheet feeders for printing presses, folding machines or the like which include idler and driven delivery wheels between which the sheets are fed when said wheels are brought into contact, a mechanism for intermittently bringing said wheels into and out of contact and an automatic throw-off mechanism for cutting off the power to the feeder, of means for automatically maintaining the delivery wheels out of contact when the power is cut off by the throw-off mechanism to prevent further feeding by the momentum of the machine after said throw-off mechanism has been actuated, comprising a trip arm adapted to engage with the intermittent mechanism in one position for holding the delivery wheels out of contact, an actuating rod connected at one extremity to the trip arm for moving the same, and interengageable means of connection between said rod and the automatic cut off mechanism, said means of connection serving to permit of the re-setting of the automatic throw-off mechanism without actuating the rod and trip arm to render the same inactive.

3. In an attachment for sheet feeders which include an automatic throw-off mechanism, a trip arm for holding the idler delivery wheels of the feeder in elevated position and out of contact with the driven delivery wheels, and means for throwing said trip arm to operative position comprising a connecting rod pivoted at one end to the trip arm and having connection at its opposite end with a movable part of the automatic throw-off mechanism, said connection comprising a head on said trip arm having a bayonet slot, and a pin carried by the movable part of the automatic throw-off mechanism arranged within said bayonet slot to permit of the re-setting of the automatic throw-off mechanism without rendering the trip arm inactive whereby manual feeding of the sheets for testing purposes may be permitted.

4. In combination, a sheet feeder for printing presses, folding machines or the like which includes an automatic cut-off mechanism, driven delivery wheels, superposed idler delivery wheels, mechanism for intermittently effecting the lifting and lowering of said idler wheels, which mechanism includes a shaft from which the wheels are supported, an arm connected to said shaft and a cam for actuating said arm, and means for maintaining the idler wheels lifted comprising a trip arm movable beneath the arm of the intermittent mechanism to prevent the lowering of the idler wheels, and a connection between said trip arm and the automatic cut-off mechanism for throwing said trip arm to active position upon operation of the cut-off mechanism, said connection comprising a connecting rod attached to the trip arm at one extremity, a clip fastened to the automatic cut-off mechanism, a head at the opposite extremity of the connecting rod, a bayonet slot in said head and a pin extending through said bayonet slot and carried by the clip to permit of resetting of the automatic cut-off without throwing the trip lever to its inactive position.

5. In combination, a sheet feeder for printing presses, folding machines or the like which includes an automatic cut-off mechanism, driven delivery wheels, superposed idler delivery wheels, mechanism for intermittently effecting the lifting and lowering of said idler wheels, which mechanism includes a shaft from which the wheels are supported, an arm connected to said shaft, a roller carrier by the free end of the arm, a bolt for mounting the roller on said arm having an eccentric head and a cam for actuating said arm, and means for maintaining the idler wheels lifted comprising a trip arm movable beneath the eccentric head of the intermittent mechanism to prevent the lowering of the idler wheels, and a connection between said trip arm and the automatic cut-off mechanism for throwing said trip arm to active position upon operation of the cut-off mechanism, said eccentric head serving to permit of regulation of the height to which the idler delivery wheels will be lifted.

6. The combination with a sheet feeder of the character set forth, of an attachment therefor constituting means for maintaining the idler delivery wheels lifted, comprising a headed member adapted to be attached to the intermittent mechanism, a horizontally pivoted trip arm mounted on the frame of the feeder, and a connection between the trip arm and the automatic cut-off mechanism of the feeder for actuating the trip arm upon operation of the automatic cut-off mechanism to dispose the same beneath the headed member of the intermittent mechanism as and for the purpose specified.

7. The combination with a sheet feeder of the character set forth, of an attachment therefor constituting means for maintaining the idler delivery wheels lifted, comprising a headed member adapted to be attached to the intermittent mechanism, a horizontally pivoted trip arm mounted on the frame of the feeder, a connection between the trip arm and the automatic cut-off mechanism of the feeder for actuating the trip arm upon operation of the automatic cut-off mechanism to dispose the same beneath the headed member of the intermittent mechanism, and means for adjusting said headed member to regulate and adapt the attachment to the lift of the idler delivery wheels by the intermittent mechanism.

8. The combination with a sheet feeder of the character set forth, of an attachment therefor constituting means for maintaining the idler delivery wheels lifted comprising a headed member adapted to be attached to the intermittent mechanism, a horizontally pivoted trip arm mounted on the frame of the feeder, a connection between the trip arm and the automatic cut-off mechanism of the feeder for actuating the trip arm upon operation of the automatic cut-off mechanism to dispose the same beneath the headed member of the intermittent mechanism, means for adjusting said headed member to regulate and adapt the attachment to the lift of the idler delivery wheels by the intermittent mechanism, and means for permitting of the resetting of the automatic throw-off mechanism to start the feeder without rendering the attachment inactive.

PAUL GITZENDANNER.
FRANK J. ALBERT.